Patented June 21, 1927.

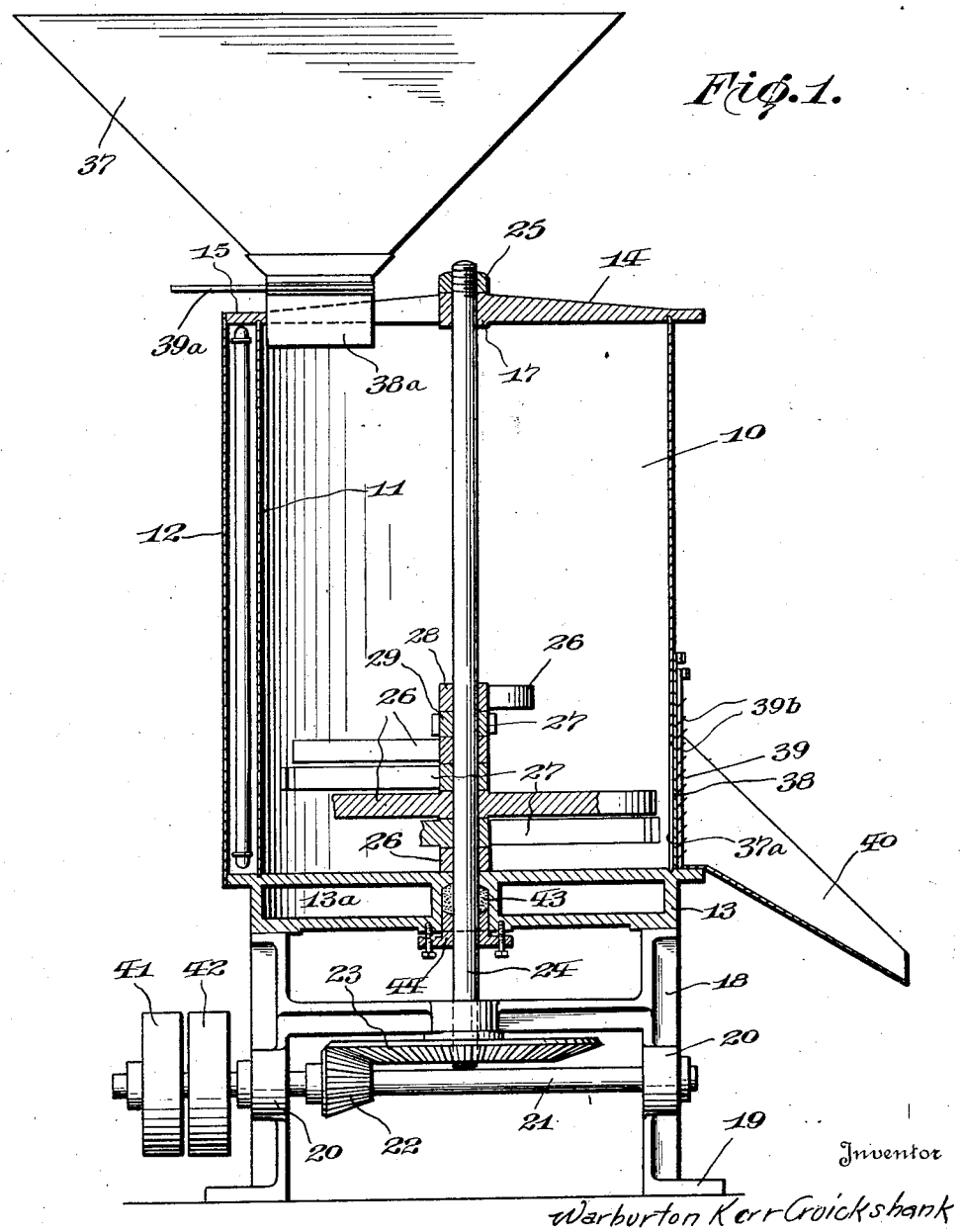

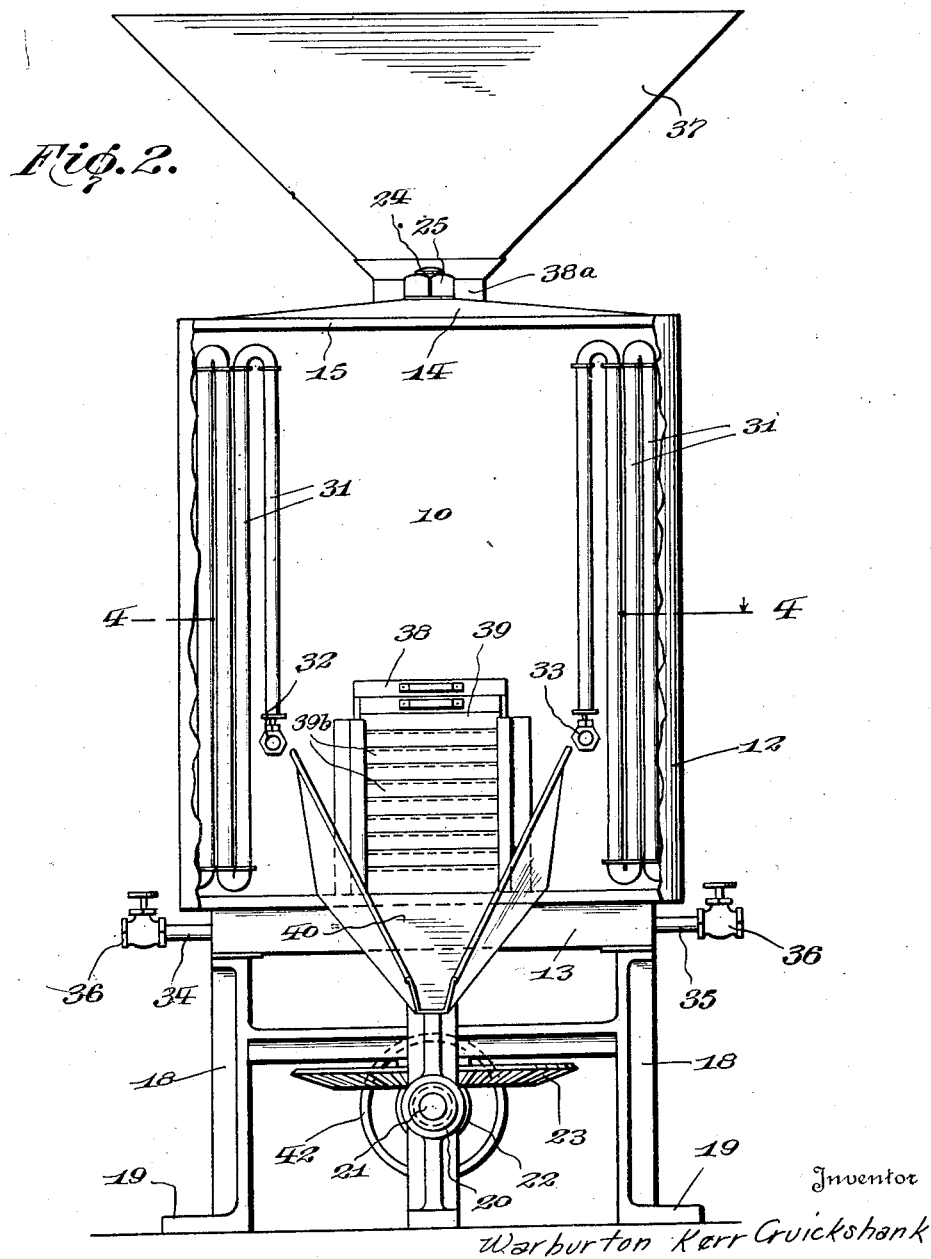

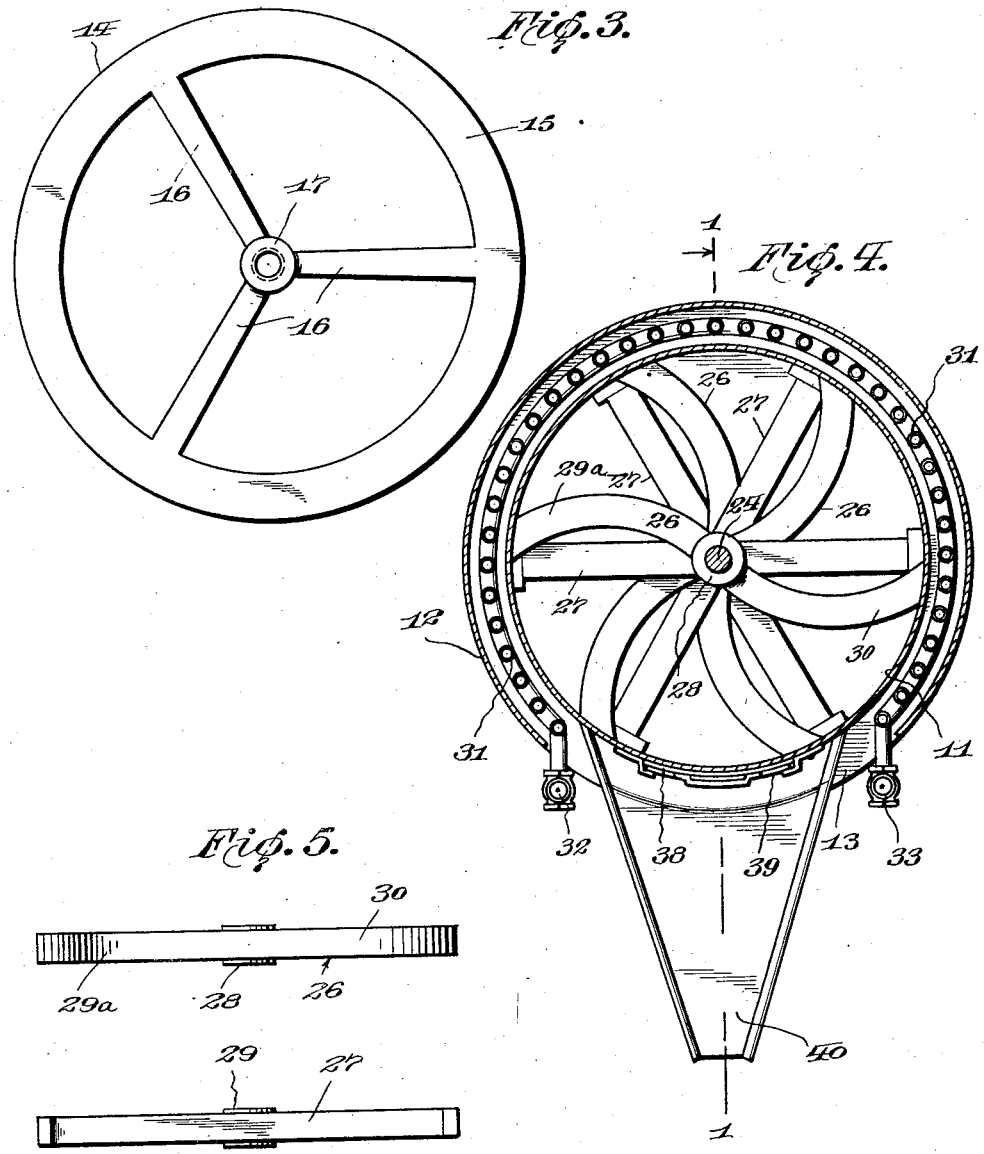

1,633,164

UNITED STATES PATENT OFFICE.

WARBURTON KERR CRUICKSHANK, OF REGINA, SASKATCHEWAN, CANADA.

PULVERIZING MACHINE.

Application filed September 28, 1926. Serial No. 138,268.

The present invention relates to improvements in pulverizing machines.

An important object of the invention resides in the production of an apparatus embodying means in the form of a pulverizing mechanism componently made up of rotatable cutters cooperating with certain stationary cutters to effect a pulverizing action.

Another object of the invention is to provide means for subjecting the material to heat and thus effect a change in the chemical structure thereof prior to the grinding action.

A further object of the invention is to provide an apparatus adapted to remove the aqueous content of the material and to evaporate the free moisture retained and finally to pulverize the changed material during the evaporation of free moisture.

A further object is to provide means for thoroughly agitating the material to further insure the uniform treatment of the whole batch.

A further object is to apply heat at a higher temperature than usual so as to rapidly dry the material and to utilize a form of apparatus of economical construction.

Further incidental objects of my invention will be apparent from the following description of the preferred embodiment thereof shown in the accompanying drawing.

In said drawings:

Figure 1 is a central vertical longitudinal sectional view, partly in elevation, of my improved apparatus, and taken on the line 1—1 of Fig. 4.

Fig. 2 is an elevation thereof with parts broken away to disclose the interior arrangement of the casing.

Fig. 3 is a plan view of a spider-like cover forming the top of the apparatus.

Fig. 4 is a horizontal transverse section taken on the line 4—4 of Fig. 2, certain pulverizing mechanism being shown in elevation.

Figs. 5 and 6 are detail views of the rotary and stationary pulverizing or cutting means.

Referring now more in particular to the accompanying drawings, let 10 denote generally the casing of my novel and improved apparatus, which comprises inner and outer jackets 11 and 12 respectively, the former being circularly continuous, while the latter extends to the front of the apparatus and has its edges terminating short of one another to define a front opening, as clearly shown in Fig. 4. Said jackets 11 and 12 are arranged concentrically and are maintained in this position through the intermediary of a base portion 13 and a top 14, the latter being spider-like in construction and presenting a rim 15 and arms 16 radiating from a central apertured hub 17. The construction thereof is clearly depicted in Fig. 3 and the purpose thereof will appear hereinafter.

Suitable supporting means for the apparatus is provided in the form of a frame 18, having the usual foot portions 19, said frame being also provided with suitable bearings 20 for the reception of a horizontal shaft 21, which carries a beveled gear 22 meshing with another beveled gear 23 keyed to the lower end of shaft 24, the latter extending longitudinally and centrally through the casing 10 and having its upper end passing through said apertured hub 17 to receive a nut 25, thus effecting the positioning of the concentric jackets 11 and 12, hereinbefore referred to.

The cutting or pulverizing mechanism will be now described in detail and in this connection particular attention is directed to Figs. 1 and 4 of the drawings, the illustration of said mechanism in Fig. 1 being shown as a true section on the line 1—1 of Fig. 4 in view of the varying angular positioning of the component parts of said mechanism.

Said pulverizing mechanism comprises a plurality of rotatable and stationary cutters 26 and 27 respectively, which are positioned in alternate superposed arrangement at the base of the apparatus, as clearly shown in Fig. 1 of the drawings. The particular structural arrangement of each of said rotary and stationary cutters will be better understood upon reference to Figs. 5 and 6 of the drawings, wherein it will be observed that both are provided with hub portions 28 and 29 respectively to receive the central shaft 24. Said rotatable cutters 26 are fixed to said shaft 24 and are provided each with a pair of diametrically opposed arcuate arm portions 29[a] and 30, as distinguished from the straight disposition of the arm portions of said stationary cutters 27. Each of these cutters terminate against the sides of the inner casing and as observed in Fig. 4 their arm portions radiate at varying angles with respect to each other, and in this spaced relation effect a remarkable pulverizing action.

While the following should not be considered as a limitation, my apparatus is best adapted for treating material such as Glauber salts, and as is well-known the effect of heat thereon is the deposition of octahedral crystals of sodium sulphate. To this end I provide a tortuous system of piping 31 positioned within the space defined by the concentric walls or jackets 11 and 12, the terminating ends of said piping emerging within the opening of the latter jacket, forwardly of the casing, and carrying valves 32 and 33 for connection with a suitable supply of heating fluid, such as hot water or the like. This arrangement insures a constant flow of hot water throughout the major portion of the apparatus and thus a somewhat uniform heat is maintained therein.

Additional heat-producing means is provided through the medium of the base 13, hereinbefore referred to, said base being provided with a chamber 13$^a$ wherein a suitable quantity of steam may circulate through the intermediary of the inlet and outlet pipes 34 and 35, the circulation of the fluid being governed by valves 36, as shown in Fig. 2.

In order to facilitate the charging of the apparatus, I provide a hopper 37, having its discharge throat 38$^a$ extending between the arms 16 of said cover 14 and upon opening the gate 39$^a$ the material is discharged upon the cutters as is quite evident. As soon as the material enters the casing the heat produced by the piping 31 causes the salts to give up a portion of their water of crystallization and thus the octahedral crystals of sodium sulphate are formed and it is this material that is subjected to the action of the cutters.

My object in positioning the cutters at various angles is now quite obvious since they operate to maintain the material a longer interval of time in the casing and further the pulverizing effect procured is surprisingly pronounced. During the pulverizing operation the crystals now becoming smaller naturally expose their water-content to the heat and as the pulverizing continues it is manifest that as the material approaches the action of the last set of cutters the resulting product is extremely comminuted and dry. However, to insure a positive drying of the material I have provided the chambered base 13 which, as aforesaid, is constantly radiating heat at a high temperature due to the circulating steam therein and any material not acted upon by the heat developed by the piping 31 must of necessity finally feel its effect.

The jacket or casing 11 is provided with an opening 37$^a$ for discharge of the comminuted material, a spout 40 leading from said opening for conveyance of the material into suitable receptacles.

This opening 37$^a$ is covered by a closing slide or door 38 and a slide or door 39 which is perforated or provided with lattice work 39$^b$. In the early stage of the process as the applied heat causes the salts to give up a portion of their water of crystallization, the slide or door 38 is raised to permit escape of the moisture, a very large percentage of this moisture, approximately 90%, passing away through the lattice work of the slide or door 39. When this operation is completed the slide or door 38 is lowered to close the opening 37$^a$, thereby sealing the jacket or casing 11. Thereafter the continued application of heat causes remaining moisture to escape in the form of steam through the casing top.

Power may be supplied to the apparatus by a shiftable belt, which in conjunction with the loose pulley 41 and the tight pulley 42 transmits motion to the rotary cutters through the medium of the beveled gearing and shaft as aforesaid.

In view of the spider-like construction of the cover 14 the egress of the water of evaporation is facilitated and in order to prevent any leakage at the point where the shaft 24 passes through the base 13, I provide a packing 43 and gland 44 and thus a tight joint is assured.

While the present is a disclosure of the preferred embodiment of the invention, it is to be understood that the invention is not limited thereto, as various changes in the minor details of construction, proportion and arrangement of parts may be resorted to without departing from the spirit of the invention as defined in the appended claims.

Variations within the spirit and scope of my invention are equally comprehended by the foregoing disclosure.

I claim:

1. In a pulverizing apparatus, a casing comprising inner and outer walls concentrically disposed and forming a space therebetween, a pulverizing mechanism positioned within said casing and comprising rotary and stationary cutters alternately disposed and positioned at varying angles with respect to each other, a tortuous conduit mounted in the space defined by said walls, said conduit having inlet and outlet openings and adapted to convey heat to the material within said casing, and a second form of heat-producing means positioned below the base of said casing and having inlet and outlet openings and adapted to convey heat to the material in its last stages of pulverization.

2. A pulverizing machine comprising a double-walled casing, said walls being concentrically disposed to define a space therebetween, a base having a chamber provided with inlet and outlet openings, a cover for said casing, a vertical shaft disposed within said casing, a pulverizing mechanism carried by said shaft and embodying alternate rotary and stationary cutters disposed at varying angles with respect to each other, and heat-conveying means in the form of a tortuous conduit mounted within the space defined by the concentric jackets and having inlet and outlet openings.

3. In a pulverizing apparatus, a casing, a second casing concentrically disposed with respect to the first casing and extending part way around the former, a pulverizing mechanism positioned within the first named casing and comprising a plurality of alternately disposed rotary and stationary cutters, all disposed at varying angles with respect to each other, heat-conveying means positioned within the space defined by the casings and having inlet and outlet openings at the outer casing and a second heat conveying means having inlet and outlet openings, positioned at the base of said cutting mechanism and adapted to influence the material in its last stages of pulverization.

4. In a pulverizing machine, a casing, cutters therein and heating means therefor, said casing having a discharge opening, removable closing means for said opening to seal it, and other, perforated, removable covering means for said opening to permit the escape of moisture while retaining the material under treatment in the casing.

Executed this 16th day of July, 1926.

WARBURTON KERR CRUICKSHANK.